United States Patent [19]

Dohmeier et al.

[11] Patent Number: 5,491,682
[45] Date of Patent: Feb. 13, 1996

[54] APPARATUS AND METHOD FOR CONTROLLABLE GAIN AND PHASE MATCHING IN AN OPTICAL DATA STORAGE SYSTEM WITH SOURCE NOISE SUBTRACTION

[75] Inventors: Steven C. Dohmeier, Rochester; Edward C. Gage, Fairport, both of N.Y.

[73] Assignee: Eastman Kodak Company, Rochester, N.Y.

[21] Appl. No.: 309,837

[22] Filed: Sep. 21, 1994

[51] Int. Cl.⁶ ...................................................... G11B 7/00
[52] U.S. Cl. .......................... 369/124; 369/116; 369/107; 369/120; 369/13
[58] Field of Search .................................. 369/124, 120, 369/99, 110, 107, 116, 114, 44.25, 44.36, 54, 13

[56] References Cited

U.S. PATENT DOCUMENTS

| | | |
|---|---|---|
| 4,691,308 | 9/1987 | Takagi et al. . |
| 4,718,121 | 1/1988 | Epworth . |
| 4,833,662 | 5/1989 | Yoda . |
| 4,964,110 | 10/1990 | Horimai et al. . |
| 4,992,754 | 2/1991 | Blauvelt et al. . |
| 5,132,639 | 7/1992 | Blauvelt et al. . |
| 5,166,509 | 11/1992 | Curran . |
| 5,339,302 | 8/1994 | Takahashi et al. ........................ 369/54 |
| 5,363,363 | 11/1994 | Gage ........................................ 369/116 |
| 5,392,271 | 2/1995 | Matsui ...................................... 369/120 |
| 5,396,478 | 3/1995 | Krantz ...................................... 369/120 |

FOREIGN PATENT DOCUMENTS 60-93649  5/1985  Japan .

OTHER PUBLICATIONS

A. Marchant, "Optical Recording: A Technical Overview," Addison-Wesley, Reading, Mass., pp. 209-210, 1990.
W. Schlichting et al., "Signal and noise with a magnetic circular dichroism detection system in optical data storage," Journal of Applied Physics, vol. 75 (5), pp. 2322-2324, Mar. 1994.

*Primary Examiner*—Loha Ben
*Attorney, Agent, or Firm*—Raymond L. Owens

[57] ABSTRACT

An apparatus and method for reducing optical source noise and other common-mode system noise in a data signal read from an optical storage medium. An exemplary apparatus in accordance with one aspect of the present invention includes a first detector to generate the data signal by detecting a return beam resulting from application of a radiation beam to the medium; a second detector to generate a source monitor signal by detecting radiation from an optical source providing the radiation beam; a correction circuit adapted to receive the data signal and the source monitor signal and generate a corrected data signal therefrom; and means for controlling the gain of a signal path of at least one of the data signal and the source monitor signal in response to, for example, low-frequency amplitude differences between the data signal and the source monitor signal. One or more delay lines may be included to provide phase matching of the data signal and source monitor signal at the correction circuit input.

20 Claims, 6 Drawing Sheets

5,491,682

APPARATUS AND METHOD FOR CONTROLLABLE GAIN AND PHASE MATCHING IN AN OPTICAL DATA STORAGE SYSTEM WITH SOURCE NOISE SUBTRACTION

CROSS-REFERENCE TO RELATED APPLICATION

The present invention is related to U.S. patent application Ser. No. 07/961,965, filed Oct. 16, 1992, entitled "Apparatus and Method for Laser Noise Cancellation in an Optical Storage System Using a Front Facet Monitor Signal," and assigned to the assignee of the present invention, now U.S. Pat. No. 5,363,363. The disclosure of this related application is incorporated herein by reference.

1. Field of the Invention

The present invention relates generally to optical data storage systems. More particularly, the present invention relates to an improved optical head which utilizes an optical source monitor signal to limit the effects of system noise on detected data.

2. Background of the Invention

Optical storage systems generally use a radiation beam to record data on and retrieve data from an optical storage medium, and are often susceptible to the effects of a number of different types of system noise. For example, a laser diode or other optical source in an optical head used to read recorded data from compact disks (CDs) may exhibit instabilities which cause variations in the power level of the read beam. Such instabilities may be generally referred to as optical source noise or relative intensity noise (RIN). RIN represents a type of common-mode noise, or a noise component which is typically common to differential detection channels in an optical head. In addition, the system may be susceptible to noise generated by variations in the CD or other optical storage medium. Noise components resulting from the recording medium may be generally referred to as media reflectivity noise (MRN).

A technique which uses subtraction of a front facet monitor signal to limit the effects of RIN and other types of common-mode system noise on the read-out data signal is described in the above-cited U.S. patent application Ser. No. 07/961,965. FIG. 1 illustrates an exemplary prior art optical system 10 which utilizes this front facet substraction technique. A radiation beam is generated by an optical source 14, which may be a laser diode, a laser, an LED or any other source of optical radiation. The radiation beam from optical source 14, also referred to as a read beam, is collimated by collimating lens 16. The collimated radiation beam is transmitted through a beam splitter 18 and applied to a quarter-wave plate 20. A surface 19 in the beam splitter 18 transmits part of a linear polarization of the radiation beam, such as 90% of a p-polarization, and quarter-wave plate 20 provides a circular polarization to the linearly-polarized beam transmitted by surface 19. The circularly-polarized radiation beam from quarter-wave plate 20 is focused by an objective lens 22 onto one of a number of data tracks 24B on a storage medium 24. The data tracks 24B are generally arranged in a spiral or in concentric circles on a data storage surface 24A of the storage medium 24, a portion of which is shown in a side cross-sectional view in FIG. 1. The incident radiation beam reads data previously recorded in the form of marks on data storage surface 24A, as is well-known in the art. The medium 24 in the system of FIG. 1 may be a write-once medium of the ablative or phase-change type, any other type of write-once medium having a surface which interacts with an incident radiation beam, or a magneto-optic medium suitable for single-ended detection. Of course, the system 10 may also be used to record data on the medium 24, by, for example, modulating the incident radiation beam with a stream of recording data.

The interaction with recording medium surface 24A causes the incident radiation beam to be reflected therefrom. The resulting radiation beam, referred to herein as a return beam, is collimated by objective lens 22 and then passes through the quarter-wave plate 20. The quarter-wave plate 20 converts the circularly polarized return beam to a linear s-polarized return beam. The linear s-polarization is perpendicular to the linear p-polarization of the incident radiation beam transmitted through beam splitter 18. When the s-polarized return beam is applied to the beam splitter 18, it is reflected toward a detector focusing lens 26 by the surface 19 of the beam splitter 18. The surface 19 may be, for example, a multilayer coating which transmits about 90% of the p-polarized light incident thereon, reflects about 10% of the p-polarized light, and reflects substantially all of the s-polarized light. The focusing lens 26 converges the return beam onto a detector array 28 which generally includes a number of detectors for detecting portions of the return beam. Signals from the detectors in detector array 28 may be combined to generate focus and tracking error signals, and a data signal, in a manner well-known in the art. The focus and tracking error signals may be used to control the position of objective lens 22 in order to maintain the radiation beam in-focus and on-track, respectively, relative to the optical storage medium 24. The data signal is indicative of data recorded on the data track scanned by the radiation beam. The portion of the optical system 10 which generates and processes the radiation beam is often referred to as an optical head.

The surface 19 of beam splitter 18 also reflects a portion of the incident radiation beam generated by source 14 toward a detector focusing lens 30. The reflected portion includes the 10% of the incident beam p-polarized light which is not transmitted by surface 19 to quarter-wave plate 20. Focusing lens 30 directs the reflected portion of the incident radiation beam onto a detector 32. The detector 32, also referred to herein as a front facet detector or a source monitor detector, is an optical detector, such as a photodiode, which generates a front facet monitor (FFM) signal. The FFM signal, also referred to herein as a source monitor signal, is indicative of the intensity level of the incident radiation beam and therefore varies in accordance with the optical source noise. The data signal from detector array 28 is applied via amplifier 34 to an inverting input of a differential amplifier 36, and the FFM signal is applied to the non-inverting input of amplifier 36. The output of amplifier 36 represents a corrected data signal generated by subtracting the FFM signal from the data signal, such that the amount of optical source noise present in the data signal is substantially reduced. This technique is referred to as front facet subtraction in part because the portion of the incident radiation beam detected in detector 32 generally exits the front facet of a laser diode optical source.

The noise reduction performance of systems such as that shown in FIG. 1 generally depends upon proper gain and phase matching of the data signal channel and the FFM signal channel at the input of the differential amplifier 36, such that the optical source noise effects common to both channels may be optimally cancelled out. It is usually desirable to obtain subtraction of such common-mode noise from the data channel over the greatest possible bandwidth, and therefore proper gain and phase matching of the two channels should be provided over a wide range of frequencies.

A number of factors may limit the ability to provide proper gain matching of the data signal channel and the source monitor signal channel over a broad bandwidth. For example, the amount of light received in the data signal detector and FFM signal detector may vary as a result of non-uniformities in the production of optical heads, and it may thus be difficult to match the amplitudes of the data and FFM signal channels using fixed-gain amplifiers in a high percentage of heads. Such non-uniformities may include differences in head efficiency of up to several percent arising from variations in optical components and alignment. Another possible limiting factor is that MRN and other variations in the recording medium may alter the relative light intensities at the data and FFM signal detectors. Variations in media reflectivity can result from coating non-uniformities and birefringence present over the surface of many commonly-used optical recording media, and can produce low-frequency changes in light levels at the data signal detector. Yet another possible limiting factor is the effect of phase mismatch between the data signal and FFM signal. Phase mismatch is primarily a result of electrical propagation delay differences between the data and FFM signal channels, and can produce degradations in the subtracted noise levels similar to those resulting from the above-described variations in detected signal amplitude.

As is apparent from the above, a need exists for an optical head which exhibits a matched gain and phase relationship between a data signal channel and a source monitor signal channel over a broad bandwidth, such that the effectiveness of source noise subtraction is significantly improved.

SUMMARY OF THE INVENTION

The present invention provides an apparatus and method for improving noise reduction in an optical head by amplitude and phase matching a read-out data signal and a source monitor signal. An exemplary apparatus in accordance with one aspect of the present invention may include a first detector to generate the data signal by detecting a return beam resulting from application of a radiation beam to the medium; a second detector to generate a source monitor signal by detecting radiation from an optical source providing the radiation beam; a correction circuit adapted to receive the data signal and the source monitor signal and generate a corrected data signal therefrom; and means for controlling the gain of a signal path of at least one of the data signal and the source monitor signal in response to the data signal and the source monitor signal. In one embodiment of the present invention, the gain of the source monitor signal path is controlled in response to low-frequency amplitude differences between the data signal and the source monitor signal. One or more delay lines may also be included to provide phase matching of the data signal and source monitor signal at the correction circuit input. The corrected data signal may be generated by subtracting the source monitor signal from the data signal. The optical source may be a laser diode and the source monitor signal may be a front or rear facet monitor signal.

In accordance with another aspect of the present invention, a method is provided which may include the steps of providing an optical source to generate a radiation beam; generating a data signal by detecting a return beam resulting from application of the radiation beam to the medium; generating a source monitor signal by detecting radiation from the optical source; generating a corrected data signal from the data signal and the source monitor signal; and controlling a gain of a signal path of at least one of the data signal and the source monitor signal in response to, for example, low-frequency amplitude differences between the data signal and the source monitor signal.

The present invention provides a simple and inexpensive solution to the removal of optical source noise or other common-mode noise from a data signal in an optical data storage system. More particularly, the present invention permits control of the dynamic gain and phase relationships between the data signal and a source monitor signal over a broad bandwidth, and thereby provides improved noise reduction over a wide range of optical head efficiencies and media reflectance values. The present invention automatically compensates for dynamic variations in signal magnitudes between the data and source monitor channels, and enables phase matching of the channels by use of, for example, a delay line, such that noise reduction by front facet subtraction techniques is considerably improved.

Further features of the invention, its nature and various advantages will become more apparent from the accompanying drawings and following detailed description of the invention.

DETAILED DESCRIPTION OF THE INVENTION

The present invention provides improved noise reduction in a data signal read from an optical recording medium. Although the present invention is particularly well-suited to provide noise reduction in the reading of data stored on optical media, improvements may also be obtained in optical recording applications such as direct-read-during-write (DRDW). The present invention may be used in a variety of different optical storage systems, including write-once and read-only systems, single-ended magneto-optic systems and optical tape systems. Single-ended magneto-optic systems are described in, for example, W. Schlichting et al., "Signal and noise with a magnetic circular dichroism detection system in optical data storage," Journal of Applied Physics, Vol. 75 (5), pp. 2322–2324, March 1994, and A. Marchant, "Optical Recording: A Technical Overview," Addison-Wesley, Reading, Mass., pp. 209–210, 1990. Furthermore, the present invention is not limited to the above applications, but can instead be used in any application in which a source and a detector are used to monitor the occurrence of events where the source has undesirable noise components which degrade the ability of the detector to monitor the events, including, for example, optical scanners.

Figure 1:
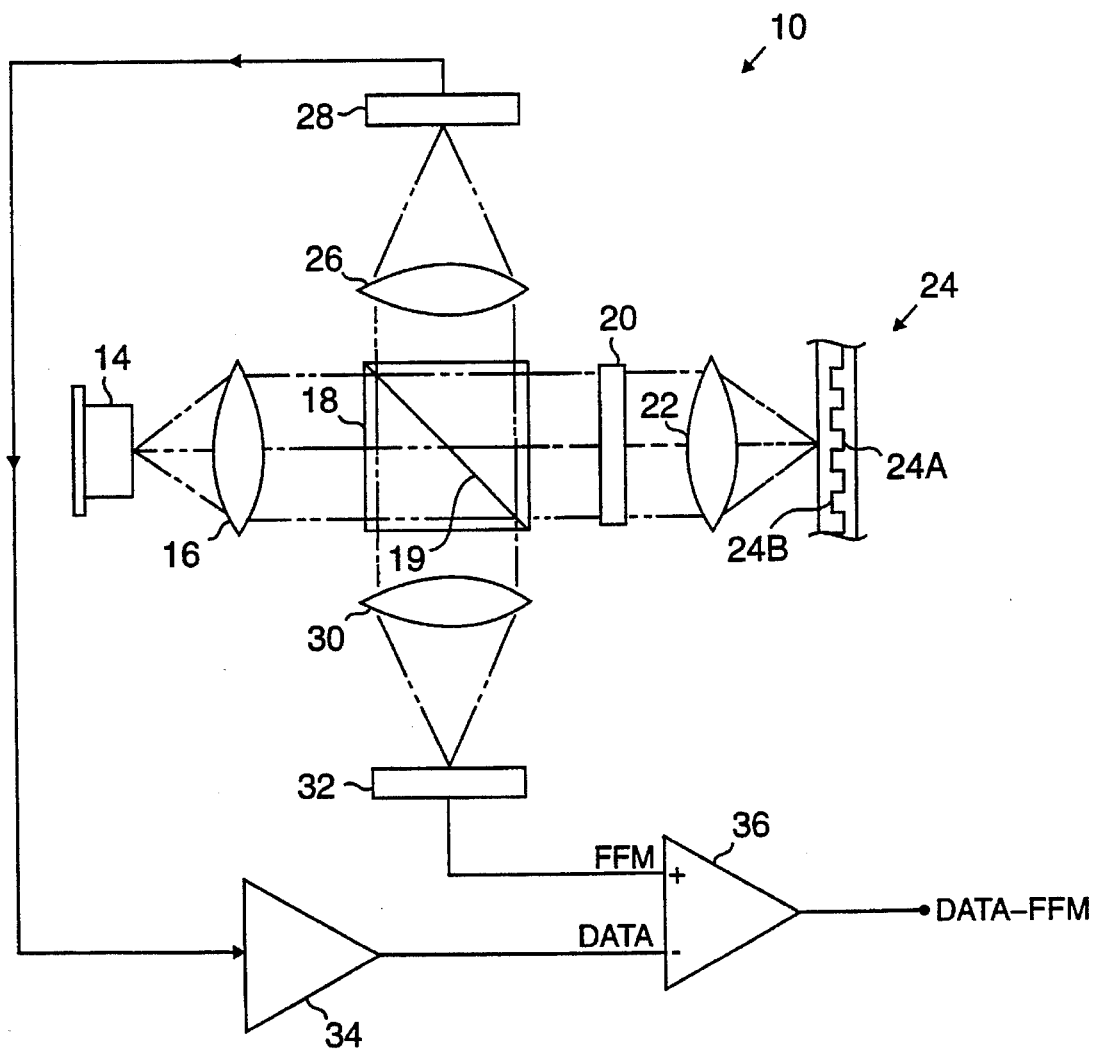
FIG. 1 shows a prior art optical data storage system which utilizes front facet subtraction to limit the effects of system noise on a read-out data signal.
Figure 2:
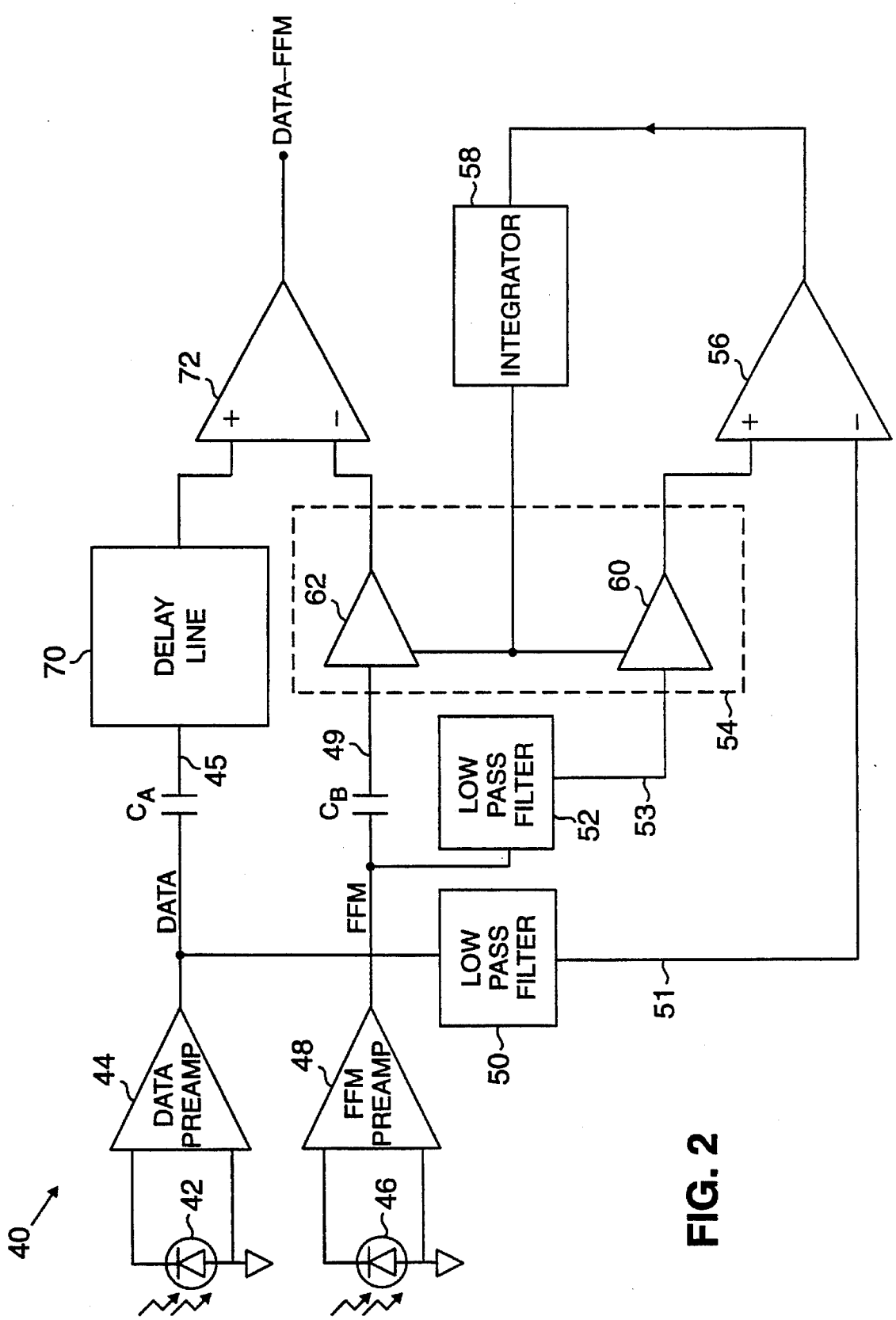
FIG. 2 is an exemplary embodiment of a noise reduction circuit in accordance with the present invention.

FIG. 2 shows an exemplary embodiment of a noise reduction circuit 40 in accordance with the present invention. The circuit 40 includes a data detector 42 which may correspond to, for example, one or more of the detectors in the detector array 28 of FIG. 1. The detector 42 detects a return beam resulting from application of an incident radiation beam to an optical storage medium. A return beam in accordance with the present invention may be, for example, reflected, diffracted or transmitted by the storage medium. As noted above, the storage medium may be a phase-change type medium, a magneto-optic medium, an ablative medium or any of a number of other types of storage media. The return beam varies in accordance with data stored on the storage medium. As a result of these variations in the return beam, the current through the detector 42 will also vary. A preamplifier 44 converts current variations through detector 42 to voltage variations at the preamplifier output. A voltage signal at the output of data preamplifier 44 will therefore vary in accordance with the data read from the optical storage medium by the incident radiation beam. This signal is referred to herein as a data signal in that it is representative of data retrieved from the storage medium. A data signal in accordance with the present invention may also be a current signal or any other type of electrical signal.

The data signal from preamplifier 44 is then supplied to a capacitor $C_A$ and to a low pass filter 50. The capacitor $C_A$ passes only alternating-current (AC) components of the data signal onto line 45, and the low pass filter 50 passes low-frequency (LF) components, including direct current (DC) components, onto line 51. The signal path traveled by the AC components of the data signal will be referred to as the data signal AC channel. Although those skilled in the art will recognize that capacitor $C_A$ does not provide a sharp cut-off at a particular frequency, in this embodiment AC components are generally considered to be components other than DC. In alternative embodiments, the capacitor $C_A$ may be replaced with a more complex signal filter to provide any desired frequency response in the AC channel, or may be eliminated such that the AC channel receives all signal components including DC. The signal path traveled by the LF components will be referred to as the LF channel. In this embodiment, the LF channel may include DC components as well as AC frequency components of up to about 10 kHz to 100 kHz.

It should be noted that the separation of AC and LF signal components in a given application can vary as a function of the data rate, the speed at which the media travels in the optical head, the detection technique used, and a number of other factors. In addition, there will generally be some overlap in the groups of components designated herein as AC and LF components. For example, the capacitor $C_A$ may pass certain signal components which are also passed by low pass filter 50. The designation of a particular channel as AC or LF herein thus serves only to indicate the general nature of the frequency components passing through each channel, rather than a precise frequency value separating the channels. An AC channel herein is therefore one which generally passes higher frequency AC components, such as those corresponding to read-out data, while an LF channel is one which generally passes low-frequency components, such as those corresponding to certain source and media noise variations.

The circuit 40 also includes a front facet detector 46. The front facet detector 46 is also referred to herein as a front facet monitor or, more generally, an optical source monitor. The detector 46 detects a portion of the incident radiation beam before the beam is applied to the optical storage medium. Although in systems utilizing a laser diode optical source the detector 46 generally monitors radiation from a front facet of the laser diode, the detector 46 could be used to monitor radiation from a rear facet of the laser diode. Detectors 42 and 46 may be, for example, positive-intrinsic-negative (PIN) or avalanche photodiodes, or any other device capable of detecting incident optical radiation. Suitable photodiodes for detectors 42, 46 include part Nos. FFD100 and FFD200, from EG&G Optoelectronics of Quebec, Canada.

One possible technique for detecting a portion of an incident radiation beam was described above in conjunction with FIG. 1. Any of a number of alternative techniques could also be used to detect radiation from the optical source in order to provide an indication of the intensity level of the incident beam. For example, radiation from a rear facet of a laser diode optical source could be detected by suitable placement of detector 46 in the path of this radiation. The noise fluctuations in the incident radiation beam are detected by detector 46 as current variations. These current variations are then converted to voltage variations in FFM preamplifier 48. The preamplifier output voltage will thus exhibit amplitude variations corresponding to noise in the optical source generating the incident radiation beam. The preamplifier output is a time varying voltage which is referred to herein as an FFM signal or, more generally, a source monitor signal. The source monitor signal could also be a current signal supplied directly from detector 46.

The FFM signal is then separated into AC and LF components in a manner similar to that described above for the data signal. The FFM signal is supplied to a capacitor $C_B$ which blocks DC components of the FFM signal from passing onto line 49. Line 49 is thus part of an AC channel for the FFM signal, the significance of which will be described below. The FFM signal is also supplied to a low pass filter 52 which passes LF components of the FFM signal. Line 53 is therefore considered part of an LF channel for the FFM signal. As noted above, in one embodiment of the present invention, these LF components are components having frequencies of up to about 10 kHz to 100 kHz. Both the data signal and FFM signal are thus separated into AC components and LF components which propagate along an AC channel and an LF channel, respectively. As previously mentioned, there may be some overlap in the frequency components of the AC and LF channels.

The LF components of the data signal and FFM signal pass through signal lines 51, 53, respectively. The FFM LF channel includes a portion of a dual variable gain amplifier 54. One of the amplifiers in the dual variable gain amplifier 54 provides a variable gain to the LF components of the FFM signal. The amplified LF components of the FFM signal are then supplied to the non-inverting input of a differential amplifier 56. The LF components of the data signal are supplied to the inverting input of amplifier 56. It should be noted that, in general, the differential amplifier inverting or non-inverting terminal designations shown herein could be reversed in alternative embodiments. Amplifier 56 generates a balance error signal which is then supplied to an integrator 58. The error signal indicates amplitude differences between the LF components of the data and FFM signals. Integrator 58 generates a negative feedback control voltage from the balance error signal. This feedback control voltage is supplied to a gain control input of variable gain amplifiers 60 and 62 within dual variable gain amplifier 54. In alternative embodiments of the present invention, the integrator 58 could be eliminated and the balance error signal applied directly to the gain control input.

The variable gain amplifier 62 receives the AC components of the FFM signal from capacitor $C_B$ via line 49. The amplified AC components are then supplied to an inverting input of a differential amplifier 72. The AC components of the data signal are supplied to a delay line 70 from capacitor $C_A$ via line 45. The output of delay line 70 is supplied to a non-inverting input of differential amplifier 72. The amplifier 72 generates a corrected data signal by subtracting the AC components of the FFM signal from the AC components of the data signal. This exemplary technique, referred to as front facet subtraction and described in greater detail above in conjunction with FIG. 1, is one type of noise reduction which may be improved using the teachings of the present invention.

The exemplary circuit 40 thus divides both the data signal and FFM signal into AC and LF components, such that the AC components can be amplified to maximum levels. It should be noted that in many optical heads, the DC and other LF components of the data and source monitor signals may have signal levels several times greater than those of the AC components. It is therefore desirable to remove the higher-amplitude, LF components from these signals such that the lower-amplitude, higher-frequency AC signal and noise components may be amplified to the maximum possible levels. In addition, subsequent signal processing hardware generally does not require the LF components of the data and source monitor signals. Alternative embodiments may eliminate capacitors $C_A$ and $C_B$ such that all data and source monitor signal components are supplied to amplifier 72.

The LF components of the data and FFM signals provide low-frequency information regarding the amount of light incident on detectors 42, 46. More specifically, this low-frequency information may be used to indicate a ratio between the light incident on detector 42 and the light incident on detector 46. In general, the detector light level ratios in an optical head are substantially independent of frequency. As a result, the intensity of light detected at higher frequencies can be predicted by the low-frequency information provided by the LF components of the data and source monitor signals. Simpler and less expensive monitoring techniques can therefore be provided using the low-frequency information from the LF components of the data and source monitor signals.

The noise reduction circuit 40 illustrated in FIG. 2 thus provides a low-frequency gain control servo loop for a source monitor signal. The servo loop includes low pass filters 50 and 52, variable gain amplifier 60, differential amplifier 56 and integrator 58. The loop is responsive to the data and source monitor signals, and in this embodiment is responsive to amplitude differences between the LF components of the data and source monitor signals. These amplitude differences are used to set the variable gain of variable gain amplifiers 60 and 62 such that the amplitude of the AC components of the data signal and the source monitor signal are matched at the input of differential amplifier 72. This will allow maximum common-mode noise reduction using, for example, a front facet monitor subtraction technique. As used herein, the term "common mode noise" refers to noise components, such as those corresponding to optical source noise, which are common to both the data signal and the source monitor signal. The output of amplifier 72 is thus a corrected data signal which exhibits significantly reduced amounts of common-mode system noise.

In the embodiment of the present invention illustrated in FIG. 2, variable gain amplifiers 60 and 62 are matched amplifiers in the dual variable gain amplifier 54. The amplifiers 60, 62 share a common gain control input and will both produce a similar gain in response to a given input control voltage. The use of matched amplifiers 60, 62 permits accurate control of the variable gain in the AC channel of the FFM signal using a servo control loop which operates on the LF components of the FFM signal. Of course, in other embodiments, the amplifiers 60, 62 may be separate amplifiers selected to have similar variable gain responses. Also, separate control voltages may be generated for each of the variable gain amplifiers 60, 62. As another alternative, a microprocessor-controlled variable gain control voltage could be used, such that the control voltage applied to a given variable gain amplifier could be suitably adjusted to provide a desired relationship between the gains in the AC and LF channels.

The delay line 70 may be used to provide phase matching of the data and source monitor signals in the following manner. In general, the amplifiers used in the noise reduction circuit 40 exhibit relatively linear group delay responses. Group delay refers to the derivative of signal phase with respect to frequency, and a group delay response refers to the variation in group delay with frequency. A constant group delay can generally be considered as a fixed signal propagation time independent of frequency. Thus, the AC channels for the data and source monitor signals may be equalized using a passive analog delay line providing a fixed amount of delay. Delay line 70 may therefore be set to an appropriate value such that the AC components of the data and source monitor signals are phase-matched at the inputs of differential amplifier 72. This will allow optimum noise reduction using source noise subtraction techniques. The delay line 70 may be an adjustable delay line which provides a selectable amount of delay in discrete increments, or multiple delay lines providing a desired total amount of delay. Alternatively, the delay line 70 may be a fixed amount of delay calculated to provide the desired phase matching at the input of amplifier 72. The term "delay line" as used herein refers to devices providing either fixed or adjustable amounts of delay using physical lengths of transmission line or any other suitable delay mechanism.

The amount of delay provided by delay line 70 will generally vary depending upon the relative length of the signal paths for the data and FFM signals. It is preferred that the phase difference between the two signals at the input of differential amplifier 72 is reduced to a value less than about five degrees at the highest data channel frequency of interest. Of course, reducing the phase difference between the data and source monitor signals to zero will produce maximum benefit from source monitor subtraction. Although the delay line 70 is placed in the data signal channel in the embodiment shown in FIG. 2, it should be understood that delay may also be introduced in the source monitor signal channel, instead of or in addition to the delay in the data signal channel. In the embodiment shown, the source monitor channel exhibited a greater propagation delay than the data signal channel in part as a result of delay through amplifier 62. The delay line 70 was therefore placed in the data signal channel such that the data signal was delayed by the same amount as the source monitor signal.

The low pass filters 50, 52 should have a cut-off frequency such that the filters pass low-frequency information which is indicative of detected variations in light intensity levels at detectors 42, 46. The bandwidths of filters 50, 52 should preferably be at least six times the fundamental rotational frequency of a disk-based optical storage medium, such that the LF components will include variations in light intensity levels which result from variations in reflectance across the surface of the medium. For a typical optical storage medium, six times the rotational frequency corresponds to a low pass filter bandwidth on the order of 100 Hz. It should be noted, however, that the present invention will provide advantages using low pass filters with bandwidths of less than 100 Hz. As noted above, in one embodiment of the invention suitable cut-off frequencies for filters 50 and 52 are on the order of 10 kHz to 100 kHz, which is well above six times the medium rotational frequency in a variety of optical storage applications. A low pass filter cut-off frequency herein refers to a frequency above which signal components experience substantial attenuation, on the order of 10 dB or more.

Figure 3A:
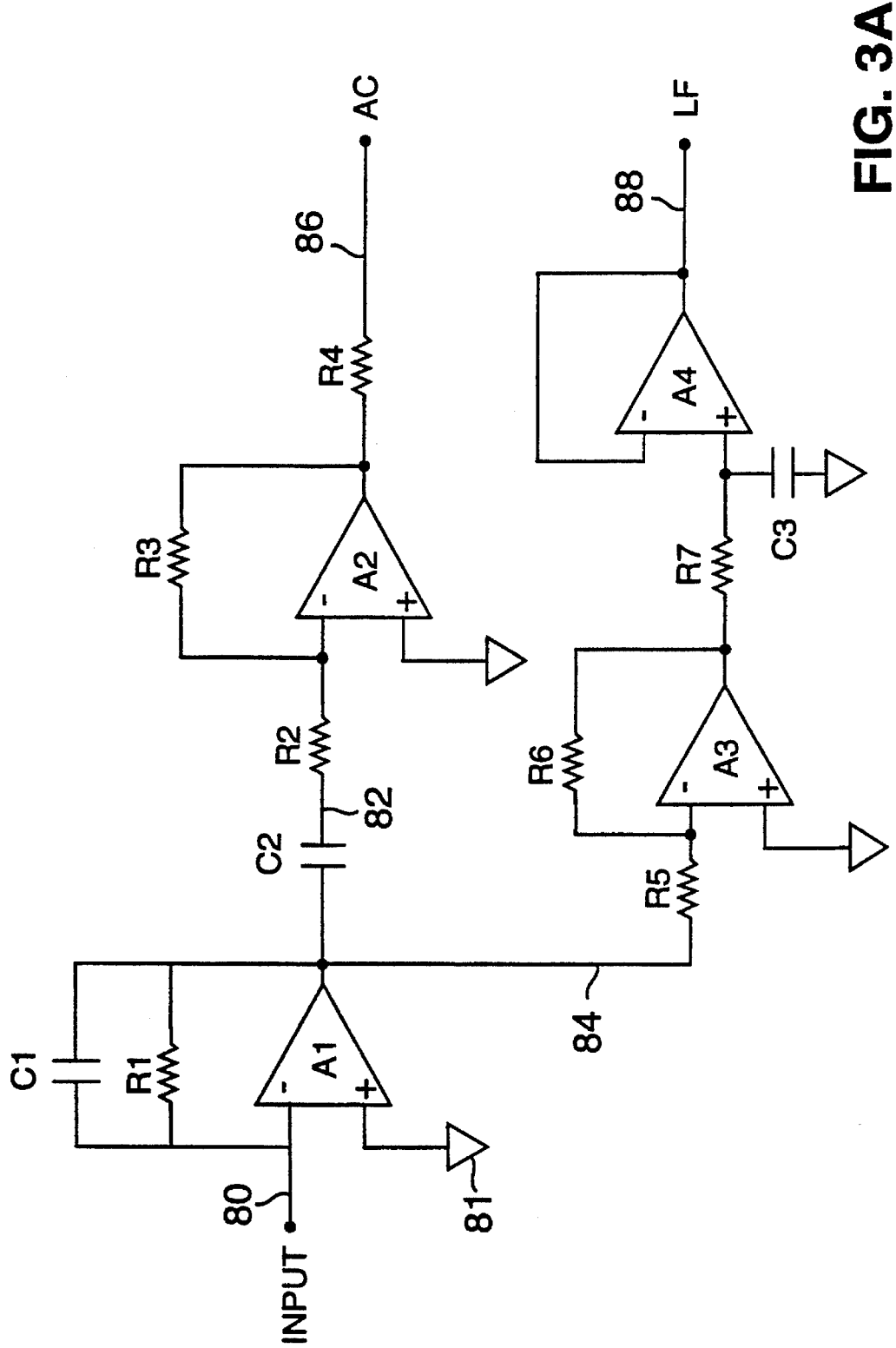
FIGS. 3A–3C are schematic diagrams of another exemplary embodiment of a noise reduction circuit in accordance with the present invention.

FIG. 3A shows a detailed schematic diagram of a portion of another exemplary noise reduction circuit in accordance with the present invention. The exemplary circuit arrangements shown in FIGS. 3A–3C correspond generally to a more detailed implementation of the circuit 40 of FIG. 2. The portion of the noise reduction circuitry shown in FIG. 3A includes circuitry corresponding to preamplifier 44 or 48, capacitor $C_A$ or $C_B$, and low pass filter 50 or 52 of FIG. 2. Amplifier A1 in conjunction with capacitor C1 and resister R1 provides an amplified version of an input signal from line 80 to a capacitor C2 and a resistor R2. The input signal is applied to an inverting terminal of A1, while the non-inverting input of A1 is connected to ground potential as designated by reference numeral 81. Suitable values for C1, C2, R1 and R2 are 1.5 pF, 1.0 µF, 3 kΩ and 200 Ω, respectively. A1 may be an OPA620 amplifier from Burr-Brown, Inc. of Tucson, Ariz. The line 82 is part of an AC channel, or signal path, for either the data signal or the FFM signal. The AC channel includes a second amplifier A2 with a feedback resistor R3. R3 may be a 2 kΩ resistor, and A2 may be an OPA621 amplifier from Burr-Brown, Inc. The amplified AC channel output is supplied to line 86 via optional matching resistor R4, which may be a 50 Ω resistor. An LF channel, or signal path, includes line 84 and also receives from amplifier A1 an amplified version of the input signal. Amplifier A3 in conjunction with resistors R5 and R6 provides additional gain to the amplified input signal in the LF channel. Resistor R7 and capacitor C3 in conjunction with amplifier A4 provide a low pass filter with a cut-off frequency of about 10 kHz to 100 kHz. The output 88 therefore includes the LF components of the amplified input signal. Suitable values for R5, R6, R7 and C3 are 200 Ω, 1 kΩ, 10 kΩ and 0.062 µF, respectively. A3 and A4 may be Burr-Brown OPA620 amplifiers.

The circuitry shown in FIG. 3A may be used in both the data signal channels and the source monitor signal channels, and a noise reduction circuit utilizing this circuity could thus include two sets of the circuitry shown in FIG. 3A. Input 80 and outputs 86, 88 are therefore generically designated in FIG. 3A without regard to association with either a data signal or a source monitor signal. The signal input on line 80 may be, for example, supplied by either detector 42 or detector 46. Amplifier A1 thus provides the functions of either data preamplifier 44 or FFM preamplifier 48 of FIG. 2, while A2 and A3 provide additional amplification in the AC and LF channels, respectively. In the embodiment shown, capacitor C2 corresponds to either capacitor $C_A$ or $C_B$ of FIG. 2.

Figure 3B:
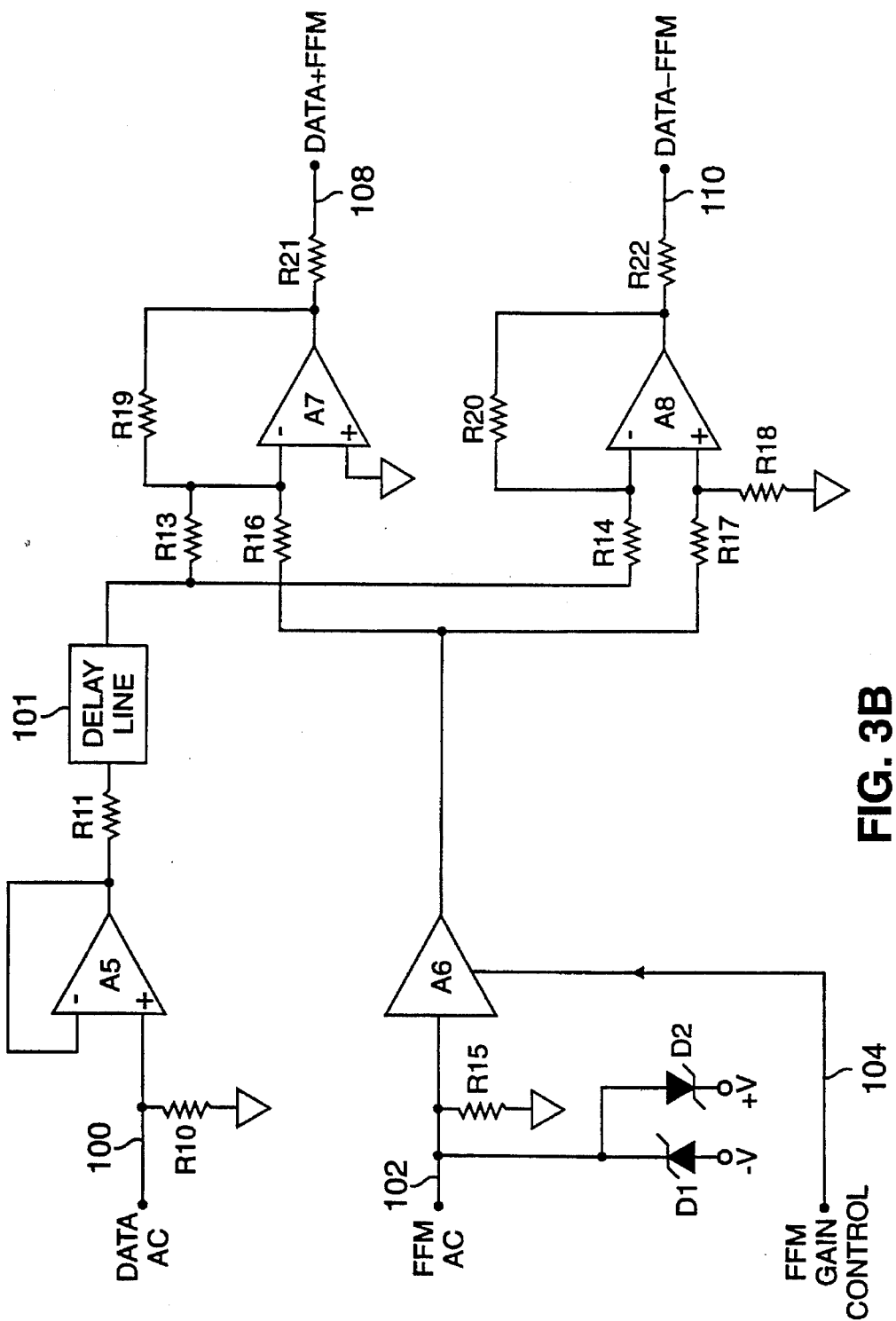

FIG. 3B shows additional circuitry in an exemplary noise reduction circuit. The AC components of the data signal are received on line 100 from line 86 of the AC channel of the data signal version of the circuitry shown in FIG. 3A. Amplifier A5 serves as a buffer amplifier, and resistor R10 serves as a terminating resistor and preferably has a value of about 50 Ω. The amplified AC components of the data signal are then supplied via resistor R11, which may have a value of 100 Ω, to a delay line 101. The delay line 101 may be, for example, a ten nanosecond, ten tap variable delay line which provides a selectable delay in one nanosecond increments, such as the part No. 60Z14A010H from Sprague Electric Co. of Stamford, Conn. The delayed AC components of the data signal are supplied via resistors R13, R14 to inverting inputs of amplifiers A7, A8, respectively.

The AC components of the FFM signal are received on line 102 from line 86 in the FFM signal version of the circuitry shown in FIG. 3A. Zener diodes D1, D2 are arranged to limit the minimum and maximum voltage on line 102. Diodes D1, D2 may be, for example, type 1N75605 Zener diodes having a reverse breakdown voltage of 8.2 volts, and are connected between line 102 and the negative and positive supply voltages −V and +V, respectively. Supply voltages −V and +V may be −12 volts and +12 volts, respectively. Resistor R15 matches the input on line 102 to the output on line 86 in FIG. 3A, and may be selected as a 100 Ω resistor. The AC components of the FFM signal are then supplied to variable gain amplifier A6 which may be one-half of a dual variable gain amplifier such as the AD602 dual amplifier from Analog Devices of Norwood, Mass. A gain control input of the amplifier A6 receives an FFM gain control voltage on line 104 which is generated in a manner to be described in greater detail below. The voltage on line 104 controls the gain of amplifier A6 in response to an error signal generated from differences in amplitude between the LF components of the FFM and data signals. The output of amplifier A6 is supplied via resistors R16, R17 to an inverting input of amplifier A7 and a non-inverting input of amplifier A8, respectively. Amplifiers A7 and A8 provide the sum and difference, respectively, of the AC components of the data and FFM signals. Resistors R19 and R20 may be selected such that the amplifiers A7 and A8 have a gain of unity. A suitable value for resistors R13, R14, R16, R17, R18, R19 and R20 is 330 Ω. Resistors R21 and R22 are optional matching resistors, and may be selected as 50 Ω to match the low impedance amplifier output to a suitable transmission line. The sum signal is present at output 108 and may be used for embodiments in which, as a result of variations in sign between the data and FFM signals, the sum rather than the difference of those signals provides proper noise subtraction. Output line 110 corresponds to a corrected data signal generated by subtracting the AC components of the FFM signal from the AC components of the data signal. The amplifiers A5, A7, A8 may be, for example, OPA620 amplifiers from Burr-Brown, Inc. of Tucson, Ariz. Both the positive and negative power supplies of these amplifiers may be decoupled by connecting a parallel combination of a 1.0 µF tantalum capacitor and a 0.01 µF capacitor between the power supply input terminal and ground potential.

Figure 3C:
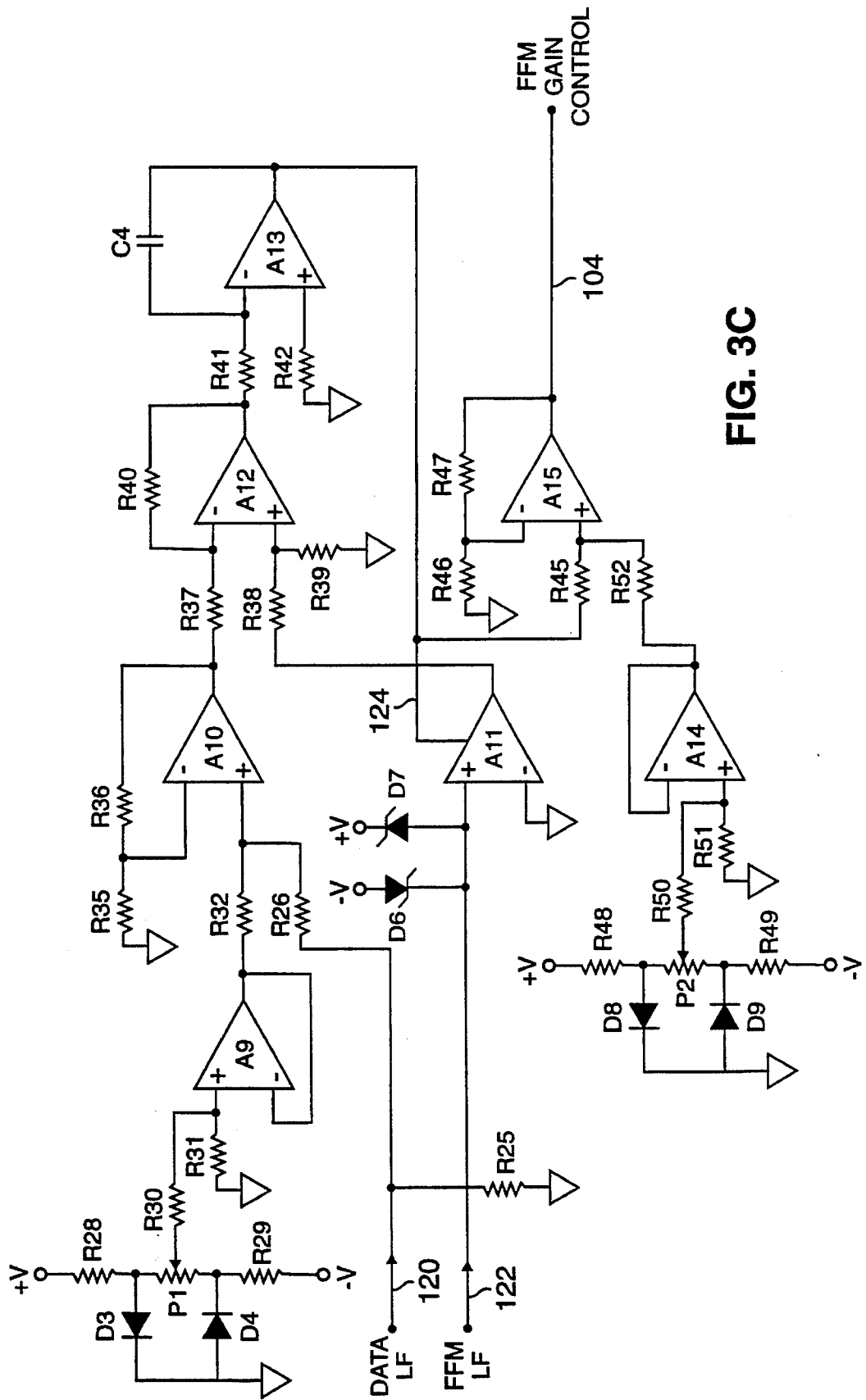

FIG. 3C shows the remaining circuitry in the exemplary noise reduction circuit. The LF components of the data signal are received on line 120 from line 88 in the data signal version of the circuitry shown in FIG. 3A. A matching resistor R25, which may have a value of 100 Ω, is included to match the line 120 to the output line 88 of the amplifier A4 in FIG. 3A. The LF components of the data signal are supplied via resistor R26 to a non-inverting input of amplifier A10. An offset adjustment circuit is made up of diodes D3 and D4, potentiometer P1 and resistors R28, R29, R30 and R31. D3 and D4 may be 1N914 diodes, P1 may be a 1 kΩ potentiometer and suitable values for R28–R29, R30 and R31 are 1 kΩ, 4.7 kΩ and 470 Ω, respectively. The offset adjustment circuit generates a variable DC offset voltage which is applied to the non-inverting input of amplifier A9. The amplifier A9 provides a buffer between the offset adjustment circuit and amplifier A10. Amplifiers A9 and A10 may be OP200 amplifiers from Analog Devices. The offset adjustment circuit provides the variable offset voltage via resistor R32 to the LF components of the data signal on line 120. Amplifier A10 amplifies the offset LF components of the data signal and supplies the amplified components to amplifier A12. A suitable value for resistors R26, R32 and R35–R36 is 10 kΩ. Amplifier A12 is a summing amplifier which combines the LF components of the data signal with the FFM signal LF components received on line 122 from line 88 in the FFM signal version of the circuitry shown in FIG. 3A. The line 122 also includes Zener diodes D6, D7 which serve to limit the maximum and minimum voltage levels of the FFM signal LF components. D6 and D7 may be type 1N75605 with a reverse breakdown voltage of about 8.2 volts. The FFM LF components are supplied via amplifier A11 and resistor R38 to a non-inverting input of amplifier A12.

Amplifier A11 is a second variable gain amplifier which is matched to variable gain amplifier A6 in FIG. 3B. The variable gain of amplifier A11 is controlled via line 124 by the output of amplifier A13. Amplifier A13 is configured to provide additional filtering for the gain control line 124, and performs the function of the integrator 58 in FIG. 2. The amplifiers A12 and A13 may be, for example, OP400 amplifiers from Analog Devices of Norwood, Mass. Gain control line 124 is also supplied via resistor R45 to a non-inverting input of amplifier A15. The non-inverting input of amplifier A15 also receives a fixed gain adjustment voltage from a fixed gain adjustment circuit made up of diodes D8 and D9, potentiometer P2 and resistors R48, R49, R50 and R51. D8 and D9 may be 1N914 diodes, P2 may be a 20 kΩ potentiometer, and suitable values for R48–R49, R50 and R51 are 1 kΩ, 9.1 kΩ and 3.3 kΩ, respectively. Amplifier A14 serves as a buffer between the fixed gain adjustment circuit and the input of amplifier A15. The output of amplifier A15 represents the FFM gain control voltage on line 104 which is supplied to amplifier A6 in FIG. 3B. Amplifiers A14 and A15 may be OP400 amplifiers from Analog Devices. Suitable values for R37–R40, R41, R42, R45–R47, R52 and C4 are 10 kΩ, 1 kΩ, 990 Ω, 10 kΩ, 10 kΩ and 0.22 µF, respectively.

In the exemplary circuitry of FIG. 3C, the line 124 controls the variable gain of amplifier A11 and the voltage on line 104 controls the variable gain of amplifier A6. As noted above, amplifiers A11 and A6 may be matched amplifiers which are part of a dual variable gain amplifier such as the Analog Devices AD602, or separate amplifiers. In the embodiment shown, amplifiers A6 and A11 are not controlled by the same control voltage line. It should be understood, however, that this arrangement is by way of example and not limitation. In other embodiments, the voltage on line 124 could be used to control both amplifiers A6 and A11, or the voltage on line 104 could be used to control both amplifiers A6 and A11. The component values and circuit arrangements of FIGS. 3A–3C are, of course, exemplary only, and many alternatives will be readily apparent to those skilled in the art.

Figure 4:
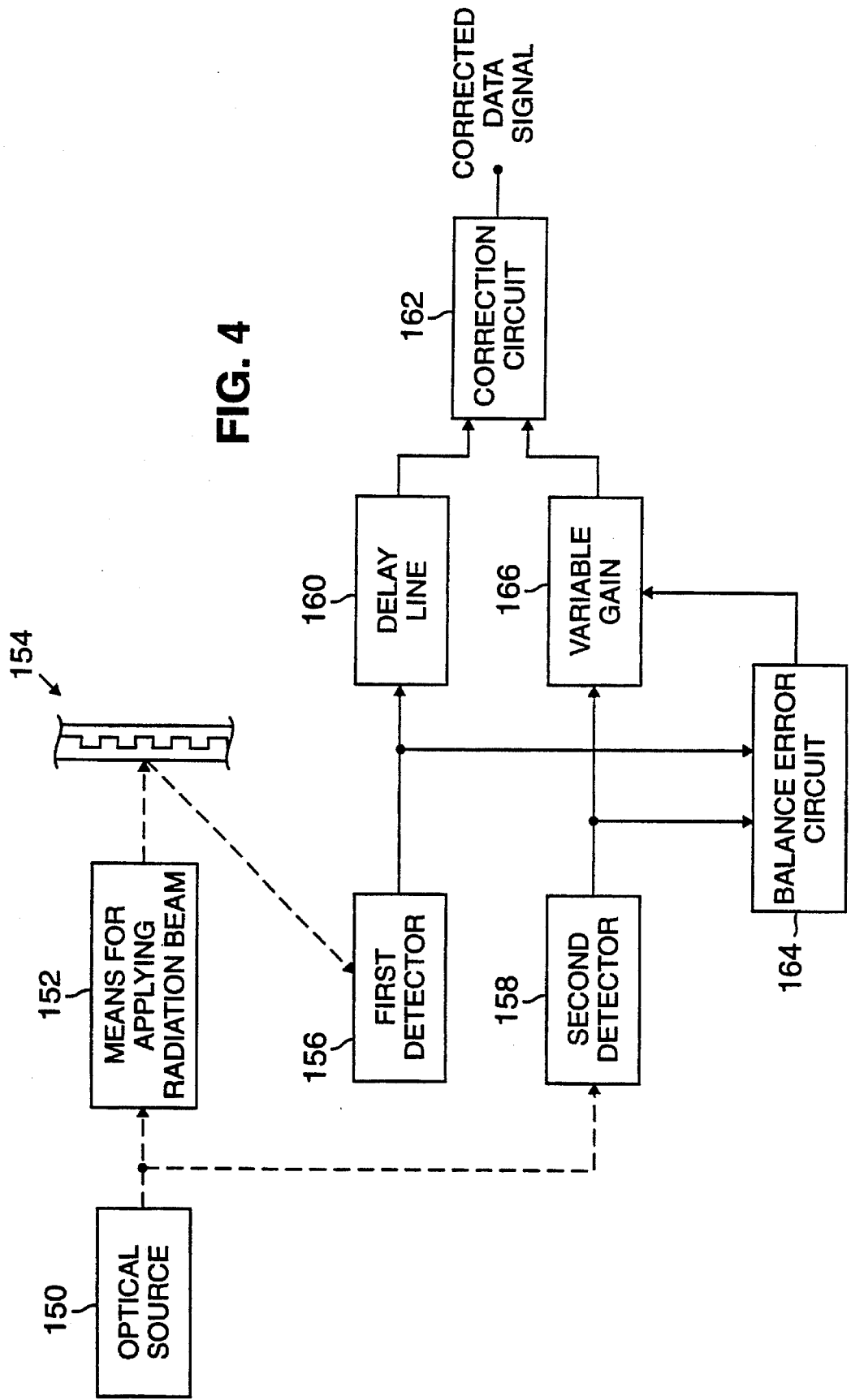
FIG. 4 is a block diagram of an exemplary optical system in accordance with the present invention.

FIG. 4 is a block diagram of an exemplary optical storage system in accordance with the present invention. An optical source 150 generates a radiation beam in the manner described above. The radiation beam is applied via application means 152 to an optical storage medium 154. The means 152 may be any of a number of different well-known configurations of optical components suitable for directing a radiation beam onto a storage medium. One possible application means includes the optical components 16, 18, 20 and 22 described above in conjunction with FIG. 1. Many alternative apparatus for applying the radiation beam to the medium will be readily apparent to those skilled in the art. A return beam resulting from application of the incident radiation beam to the medium is detected by a first detector 156. The return beam may be generated by the medium 154 reflecting, diffracting, transmitting or otherwise interacting with the incident beam. The first detector 156 detects the return beam and generates a data signal therefrom. The detector 156 may represent an array of detectors which are used to generate focus error, tracking error, and data signals in a manner well-known in the art. Additional signal combining electronics may be used to combine signals detected by each detector in the array to generate an appropriate data signal.

Radiation from the optical source 150 is applied to a second detector 158 to generate a source monitor signal. In an embodiment in which the source 152 is a laser diode and the second detector 158 detects a portion of the incident radiation beam radiating from the laser diode front facet, the source monitor signal is referred to as an FFM signal. Detectors 156 and 158 may be single or multiple element detectors and may include, for example, preamplifiers or signal combining electronics. The data signal is applied via delay line 160 to a correction circuit 162. The correction circuit 162 also receives the source monitor signal from the second detector 158 and generates a corrected data signal using, for example, a front facet subtraction technique. In one embodiment of the present invention described above, the correction circuit 162 is a differential amplifier. The correction circuit 162 could alternatively be any circuit suitable for combining and/or processing the data and source monitor signals such that the effects of system noise are reduced.

A variable gain circuit 166 is connected between the second detector 158 and the correction circuit 162. In alternative embodiments, the variable gain circuit 162 could be placed in the data signal path between first detector 156 and correction circuit 162, or a variable gain circuit could be placed in both the data signal and source monitor signal paths. In an embodiment described above in conjunction with FIG. 2, the variable gain circuit 166 was a single variable gain amplifier. Other embodiments could use any device which provides a variable amount of gain in response to an input control signal. For purposes of the present invention, a variable attenuator providing a variable amount of signal attenuation in response to a control input is considered a variable gain circuit. For example, the Analog Devices AD602amplifier noted above is also capable of providing a variable amount of signal attenuation.

The control input of the variable gain circuit 166 is connected to the output of a balance error circuit 164. The balance error circuit 164 is responsive to the data and source monitor signals and in one possible embodiment controls the variable gain of the variable gain circuit 166 in response to amplitude differences between the LF components of the data and source monitor signals. In an embodiment described above in conjunction with FIG. 2, the balance error circuit includes a pair of low pass filters 50 and 52, a differential amplifier 56, an integrator 58, and a variable gain amplifier 60 connected in the source monitor LF signal path between the low pass filter 52 and the differential amplifier 56.

The present invention may be used in conjunction with a number of other noise reduction techniques. For example, the present invention may include a servo loop to maintain the optical source output power at a desired level. Such source power servo loops typically have bandwidths on the order of 1 kHz. Alternatively, the source power servo loop could have an increased bandwidth such as that provided by wide-bandwidth laser drivers, which are generally well-known in the art. These and any of a number of other techniques could be utilized in the embodiments of the present invention described above to provide additional system noise reduction.

While a presently preferred embodiment of the invention has been shown and described, it will be manifest that many changes and modifications may be made therein without departing from the essential spirit of the invention. It is intended, therefore, in the annexed claims, to cover all such changes and modifications as may fall within the true scope of the invention.

PARTS LIST

| | |
|---|---|
| A1–A15 | amplifiers |
| $C_A$, $C_B$ | capacitors |
| C1–C4 | capacitors |
| D1–D9 | diodes |
| P1, P2 | potentiometers |
| R1–R52 | resistors |
| 10 | optical data storage system |
| 14 | optical source |
| 16 | collimating lens |
| 18 | beam splitter |
| 19 | beam splitter surface |
| 20 | quarter-wave plate |
| 22 | objective lens |
| 24 | optical storage medium |
| 24A | data storage surface |
| 24B | data track |
| 26 | detector focusing lens |
| 28 | detector array |
| 30 | detector focusing lens |
| 32 | front facet detector |
| 34 | data signal amplifier |
| 36 | differential amplifier |
| 40 | noise reduction circuit |
| 42 | data detector |
| 44 | data preamplifier |
| 45 | data signal AC channel line |
| 46 | front facet detector |
| 48 | FFM preamplifier |
| 49 | FFM signal AC channel line |
| 50, 52 | low pass filters |
| 51 | data signal LF channel line |
| 53 | FFM signal LF channel line |
| 54 | dual variable gain amplifier |
| 56 | balance error amplifier |
| 58 | integrator |
| 60, 62 | variable gain amplifiers |
| 70 | delay line |
| 72 | differential amplifier |
| 80 | detected signal input line |
| 81 | ground potential |
| 82 | AC channel line |
| 84 | LF channel line |
| 86 | AC channel line |
| 88 | LF channel line |
| 100 | data signal AC channel line |
| 101 | delay line |
| 102 | FFM signal AC channel line |
| 104 | FFM gain control line |
| 108 | sum signal output |
| 110 | corrected data signal output |
| 120 | data signal LF channel line |
| 122 | FFM signal LF channel line |
| 124 | gain control line |
| 150 | optical source |
| 152 | radiation beam application means |
| 154 | optical storage medium |
| 156 | first detector |
| 158 | second detector |
| 160 | delay line |

-continued

PARTS LIST

| | |
|---|---|
| 162 | correction circuit |
| 164 | balance error circuit |
| 166 | variable gain |

What is claimed is:

1. An apparatus for use in an optical system in which data is stored on an optical storage medium, the apparatus comprising:

an optical source to generate a radiation beam;

means for applying the radiation beam to the storage medium;

a first detector providing a data signal by detecting a return beam resulting from application of the radiation beam to the medium;

a second detector providing a source monitor signal by detecting radiation from the optical source;

a correction circuit adapted to receive the data signal and the source monitor signal from the first and second detectors, respectively, and generate a corrected data signal therefrom;

a variable gain circuit connected between at least one of the detectors and the correction circuit; and a balance error circuit responsive to the data signal and the source monitor signal and having an output connected to a gain control input of the variable gain circuit for controlling the variable gain thereof.

2. The apparatus of claim 1 further including at least one delay line connected between the correction circuit and one of the detectors to substantially match a phase of the data signal and the source monitor signal at an input of the correction circuit.

3. The apparatus of claim 1 wherein the correction circuit includes a first differential amplifier having a first input connected to the first detector and a second input connected to the second detector and wherein the corrected data signal is provided at an output of the differential amplifier and corresponds to the data signal having the source monitor signal subtracted therefrom.

4. The apparatus of claim 1 wherein the optical source is a laser diode and the second detector provides the source monitor signal by detecting a portion of the radiation beam radiating from a front facet of the optical source before the radiation beam is applied to the medium.

5. The apparatus of claim 1 wherein the optical source is a laser diode and the second detector provides the source monitor signal by detecting radiation radiating from a rear facet of the optical source.

6. The apparatus of claim 1 wherein the balance error circuit further includes:

a second differential amplifier having an output connected to the gain control input of the variable gain circuit;

a first filter connected between the first detector and a first input of the second differential amplifier;

a second filter connected between the second detector and a second input of the second differential amplifier; and a second variable gain amplifier connected between the second filter and the second input of the second differential amplifier.

7. The apparatus of claim 6 wherein the variable gain circuit is a first variable gain amplifier and the first and the second variable gain amplifiers are matched amplifiers having a common gain control input.

8. The apparatus of claim 6 further including an integrator connected between the output of the second differential amplifier and the gain control input of the variable gain circuit.

9. The apparatus of claim 6 wherein the first and second filters are low pass filters having a cut-off frequency of less than about 100 kHz, such that the variable gain of the variable gain circuit is controlled in response to low-frequency amplitude differences between the data signal and the source monitor signal.

10. The apparatus of claim 1 wherein the first and second detectors are AC coupled to the correction circuit through first and second capacitors, respectively.

11. A method of limiting the effect of system noise in an optical system in which data is stored on an optical storage medium, the method comprising the steps of:

provide an optical source to generate a radiation beam;

generating a data signal by detecting a return beam resulting from application of the radiation beam to the medium;

generating a source monitor signal by detecting radiation from the optical source;

generating a corrected data signal from the data signal and the source monitor signal; and controlling a gain of a signal path of at least one of the data signal and the source monitor signal in response to the data signal and the source monitor signal.

12. The method of claim 11 further including the step of substantially matching a phase of the data signal and the source monitor signal prior to the step of generating the corrected data signal.

13. The method of claim 11 wherein the step of providing an optical source includes providing a laser diode optical source and the step of generating a source monitor signal includes detecting a portion of the radiation beam radiating from a front facet of the optical source before the radiation beam is applied to the medium.

14. The method of claim 11 wherein the step of providing an optical source includes providing a laser diode optical source and the step of generating a source monitor signal includes detecting radiation radiating from a rear facet of the optical source.

15. The method of claim 11 wherein the step of controlling the gain of at least one signal path in response to the data signal and the source monitor signal further includes the steps of:

providing a first variable gain in a signal path of the source monitor signal;

filtering the data signal;

filtering the source monitor signal;

applying the filtered data signal and the filtered source monitor signal to a first and a second input of a differential amplifier, respectively, wherein the output of the differential amplifier corresponds to a balance error signal indicative of an amplitude difference between the data signal and the source monitor signal;

providing a second variable gain in a signal path of the filtered source monitor signal; and controlling the first and the second variable gain in accordance with the balance error signal.

16. The method of claim 15 further including the steps of:

integrating the balance error signal at the output of the differential amplifier; and controlling the first and second variable gain in accordance with the integrated balance error signal.

17. An apparatus for reducing system noise in a data signal read from an optical storage medium using a radiation beam, the apparatus comprising:

a first detector to generate the data signal by detecting a return beam resulting from application of the radiation beam to the medium;

a second detector to generate a source monitor signal by detecting radiation from an optical source providing the radiation beam;

a correction circuit adapted to receive the data signal and the source monitor signal and generate a corrected data signal therefrom; and means for controlling the gain of a signal path of at least one of the data signal and the source monitor signal in response to the data signal and the source monitor signal.

18. The apparatus of claim 17 further including at least one delay line connected between the correction circuit and one of the detectors to substantially match a phase of the data signal and the source monitor signal at an input of the correction circuit.

19. The apparatus of claim 17 wherein the means for controlling the gain further includes a first variable gain amplifier connected between the second detector and the correction circuit.

20. The apparatus of claim 19 wherein the means for controlling the gain further includes:

a differential amplifier;

a first low pass filter connected between the first detector and a first input of the differential amplifier;

a second low pass filter connected between the second detector and a second input of the differential amplifier; and a second variable gain amplifier connected between the second filter and the second input of the differential amplifier, wherein gain control inputs of the first and the second variable gain amplifiers are connected to an output of the differential amplifier, such that the gain of the source monitor signal path is controlled in response to low-frequency amplitude differences between the data signal and the source monitor signal.

* * * * *